United States Patent [19]

Meador

[11] Patent Number: 5,632,863
[45] Date of Patent: May 27, 1997

[54] BATTERY PYROLYSIS PROCESS

[76] Inventor: W. R. Meador, P.O. Box 571, Pecos, Tex. 79772

[21] Appl. No.: 344,092

[22] Filed: Nov. 22, 1994

[51] Int. Cl.$^6$ .................................................. C10B 51/00
[52] U.S. Cl. .................... 201/25; 201/3; 201/4; 201/7; 201/27; 201/28; 201/29; 241/14; 241/23
[58] Field of Search .................. 201/3, 4, 7, 25, 201/27, 28, 29, 30; 241/14, 23, 24, 25, 69, DIG. 14, DIG. 38; 75/10.19, 693

[56] References Cited

U.S. PATENT DOCUMENTS

| 4,077,847 | 3/1978 | Choi et al. | 201/21 |
| 4,775,107 | 10/1988 | Heng et al. | 241/23 |
| 4,839,151 | 6/1989 | Apffel | 423/449 |
| 5,085,738 | 2/1992 | Harris et al. | 201/11 |
| 5,284,503 | 2/1994 | Bitler et al. | 75/10.19 |
| 5,451,297 | 9/1995 | Roy | 201/25 |

*Primary Examiner*—Christoper Kim
*Attorney, Agent, or Firm*—Milburn & Peterson, P.C.

[57] ABSTRACT

Used batteries and other material for reclamation and recovery or environmentally safe disposal are transferred from a feed bin by an auger into a crusher and then into a pyrolysis chamber. The feed system excludes air or oxygen from passing through the auger and crusher into the pyrolysis chamber. The material from the crusher is transferred by an auger through the pyrolysis chamber which is heated to a decomposition temperature between 350° and 650° F. and is decomposed. The pyrolysis chamber includes a vapor recovery system for removing the vapors and maintaining a vacuum in the pyrolysis chamber. The vapors are withdrawn through a heat exchanger and into the liquid/gas separator where the condensed liquids are removed and the gas is further processed. The residue from the pyrolysis chamber is discharged into a residue recovery system which includes a closed auger for transferring the residue from the pyrolysis chamber into a bin. A pressure sensitive switch which maintains a minimum level of solid material in the bin which acts as a seal to prevent air or oxygen from entering the pyrolysis chamber. The residue is transferred to a screening collector having an upper and a lower screen. The screens are vibrated and the finer sized metals are collected from the bottom of the screening collector, the heavier metals off the lower screen and the paper and plastic off the upper screen.

5 Claims, 2 Drawing Sheets

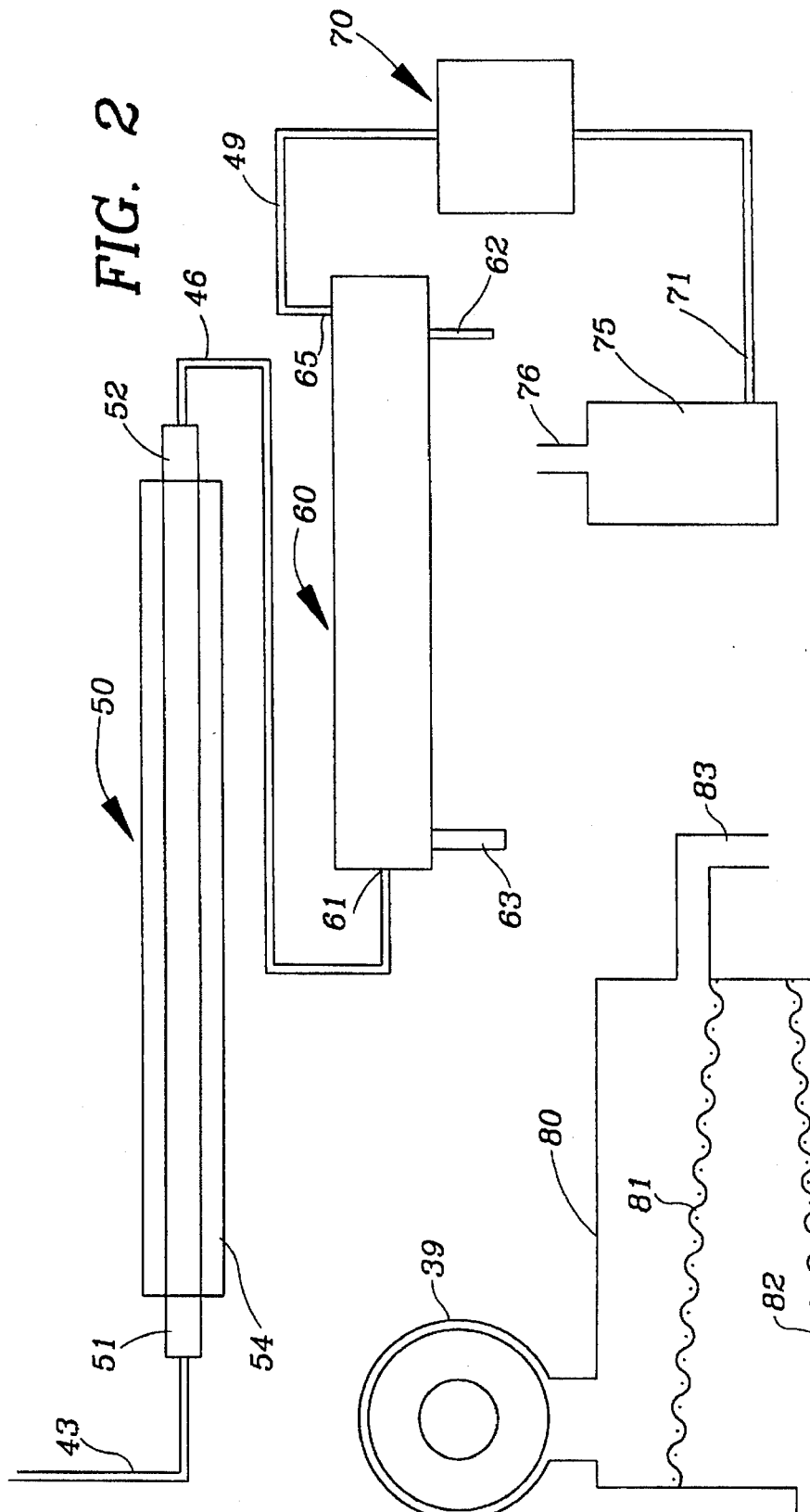

BATTERY PYROLYSIS PROCESS

BACKGROUND OF THE INVENTION

This invention relates to a process and apparatus for reclamation of batteries other than lead-acid batteries and more particular to reclamation and environmentally safe disposal of nickel cadmium, lithium, carbon-zinc, mercury, alkaline, metal hydride, etc. batteries.

Currently, there is considerable concern with the disposal of used batteries in industrial countries occasioned by the accumulation of batteries from those used in wrist watches to those used in diesel locomotives. Also, even with the increased use of rechargeable batteries, disposal still persists as a problem in many industrial countries.

Various processes have been proposed utilizing pyrolysis for reclaiming rubber tires, plastics, inorganic compounds and metals, such as, cadmium, lithium, mercury, etc. Processes dealing with the treatment of used rubber tires by pyrolysis to recover liquid and gaseous hydrocarbons and separate these from solid residue proliferate as described in various patents. Likewise, a number of pyrolysis processes are described for reclaiming waste metals containing coatings of organic insulation. Further, a number of processed have been proposed for recovery of metals used in various batteries.

U.S. Pat. No. 4,235,676, issued to Chambers discloses a process for reclamation and treatment of organic waste materials, such as, rubber automobile tires or industrial plastic waste or residential trash, which preferably has metal of inorganic matter removed therefrom, is passed through an elongated chamber by means of a screw conveyor with the temperature in the chamber maintained at 1100° F. The vapors and gases are removed from the chamber by means of a vacuum with the vapors being condensed and the gases separated therefrom. The chamber is maintained free from air or oxygen.

U.S. Pat. No. 5,085,738, issued to Harris et al discloses a method of treating and recovery of organic waste material in an oxygen-free chamber filled with molten lead which is inclined to allow organic material with a lessor specific gravity than the lead to migrate through the molten lead to a higher portion of the chamber. The organic material from the chamber is recycled as fuel gas and the residual solids flow to a reservoir connected to the chamber. Carbon black is drawn into a receiver by a vacuum line located near the top of the reservoir and all the other residual solids flow over a reservoir wall.

U.S. Pat. No. 4,515,659, issued to Wingfield, Jr. et al discloses a process for improving the pyrolytic conversion of waste selected from rubber and plastic to low molecular weight olefinic materials by employing basis salt catalysts in the waste mixture. The salt catalysts comprise alkali or alkaline earth compounds and Wingfield, Jr. cites sodium carbonate as one.

U.S. Pat. No. 4,740,270, issued to Roy discloses a process for treatment of used rubber tires by vacuum pyrolysis in a reactor to produce liquid and gaseous hydrocarbons and solids. The pyrolysis is carried out in a temperature range of 360° C. to about 415° C. under sub-atmospheric pressure. The process is claimed to increase the yield of liquid hydrocarbons and lower the yield of gaseous hydrocarbons and carbonaceous material. The process produces hydrocarbon oils suitable for use as heating fluids.

U.S. Pat. No. 4,686,008, issued to Gibson discloses apparatus for thermal decomposition or pyrolysis of shredded vehicle tires. Undecomposed rubber, fiberglass, carbon and metal products are collected at the end of the pyrolysis chamber, and the gaseous products are separately collected and sent through a fractionator. The undecomposed materials are treated separately.

A number of processes are similar to that disclosed in U.S. Pat. No. 3,448,509, issued to O'Reilly disclose a process wherein a quantity of plastic-insulated wire is placed in a sealed air-tight chamber with limited air therein. The wire is heated in the chamber to a temperature to reduce the plastic to a crisp residue and to evolve gases from the plastic. The off-gases are then wet-scrubbed to remove undesired constituents and the crisp residue is ultimately removed from the wire.

U.S. Pat. No. 3,945,890, issued to Kemp discloses a process for decomposing organic and pseudo-organic materials into useable and reusable forms. Inorganic metals and salts are treated in the same convertor system. The materials are carried on a conveyor through a controlled atmosphere chamber virtually free of oxidizing agents. A negative pressure is maintained upstream of the chamber to collect liquid and gaseous vapor streams which are processed through successive stages of collection containers, condensers and gas scrubbers.

U.S. Pat. No. 4,091,825, issued to Baker discloses another pyrolysis process in which metallic scrap containing a coating of organic insulation is processed in a pressure pyrolysis vessel maintained at a pressure between 20 to 40 psi and in a temperature range of about 500° to 1000° F. depending on the type of insulation.

A number of processes describe the method or process of treating batteries to recover useful products. Such a process is described in U.S. Pat. No. 4,775,107, issued to Heng et al which discloses a process of crushing and then roasting batteries at a temperature of 500° to 1000° C. in an oxidizing atmosphere with volatilized mercury recovered from the off-gas. The roasted material is separated by sieving and magnetic separation which separates iron-containing scrap, and the residue containing magnesium, zinc and silver. Heng et al cites several processes for treating batteries.

U.S. Pat. No. 5,199,975 issued to Gunjishima et al discloses a method for recovering cadmium in used nickel cadmium batteries by heat treatment. The process discloses the purity of high cadmium by volatilizing cadmium in a non-oxidizing atmosphere.

U.S. Pat. No. 5,252,189 issued to Celi discloses a thermal mechanical treatment in a closed container at a temperature at which, with the assistance of mechanical pressure metal-plastic and metal-metal bonds are disrupted. Synthetic plastic parts and graphite electrodes are separated by physical methods, vaporized mercury is extracted and washed with sulphuric acid. A gas washing device for inert gas leaving the container employs sulphuric acid in which the vaporized mercury reacts forming mercury sulphate.

U.S. Pat. No. 4,913,064, issued to Volhardt discloses a general waste arrangement for the low temperature carbonization of waste material. The waste materials include household and industrial waste, as well as, chemical waste containing noxious matter and dioxines and furanes containing hazardous substances. The heating system is substantially corrosion free and hazardous gases are transformed into gases with a lower level of hazardous matter by directing the heating gas of the low temperature carbonization device and into a heat exchanger of a secondary incineration device with the heat exchanger being maintained at 1200° C.

U.S. Pat. No. 5,284,503, issued to Bitler et al discloses a plasma arc furnace which pyrolyzes lead-contaminated soil and battery casing. The combustible gas along with volatilizes lead are transferred to and used a primary fuel in a conventional smelting furnace. The volatilized lead is thus transferred to the recovery and environmental equipment associated with smelting furnaces. The soil is converted into a non-toxic vitrified slag and may be crushed for use as roadway aggregate.

SUMMARY OF THE INVENTION

This invention provides an improved process and apparatus for reclamation of used batteries and recovery of the metals, and organic and inorganic materials. The process includes pyrolysis of various kinds and sizes of batteries other than lead-acid batteries in an efficient and economic process. The process comprises continually introducing previously crushed batteries into a pyrolysis chamber and conveying them by an auger through the pyrolysis chamber. Preferably, the batteries are sorted, such that, nickel cadmium batteries are processed separately from all the others. Alkaline, carbon-zinc, lithium batteries are preferably sorted but may be processed together. Mercury batteries may be processed with these latter batteries and recovered through the vapor recovery system. The chamber is maintained under a slight vacuum to withdraw the off-gases for further processing. The batteries are transferred to the pyrolysis chamber from a feed bin by a feed auger or screw conveyor into a crusher or grinder and then introduced into the pyrolysis chamber. The feed auger or screw conveyor is sealed with water or other liquid to exclude air or oxygen from the pyrolysis chamber. The pyrolysis chamber is provided with and a collector to recover the dry residue containing the valuable components of the batteries and other wastes (paper, plastic etc.) which are transferred continuously from the pyrolysis chamber by a recovery auger or screw conveyor into a hopper or bin. The recovery auger may be water sealed or by using a closed hopper with a pressure switch, the dry, solid materials will serve as a discharge valve thus, maintaining a vacuum on the system. Conveniently, the dry solid material may be delivered from the closed hopper to a screening collector by an auger system which intermittently operates responsive to a pressure switch on the closed hopper thereby controlling the level of the dry residue in the closed hopper.

The dry residue, contains carbon and plastics that are not decomposed in the pyrolysis chamber; ferrous and non-ferrous metals, such as, iron, copper, solder; and zinc magnesium dioxide or nickel cadmium (depending on the batteries being processed) are conveyed and discharged into the screening collector. Lithium batteries are pre-treated in a potassium hydroxide electrolyte which deactivates the lithium battery leaving lithium salt which is virtually undetectable after pyrolysis. The screens of the screening collector are vibrated and the carbon and plastic are retained on the upper of coarse screen, the ferrous and non-ferrous metals are collected on the fine screen and nickel cadmium, zinc magnesium dioxide pass through the fine screen and are collected from the bottom of the screening collector.

In a vapor recovery system, the off-gases from the pyrolysis chamber are sent through a heat exchanger to condense the liquids. The heat exchanger may be raised at one end to expedite complete discharge of liquids. The gases and liquid flow into a horizontal separator where the liquid is removed and may be further recovered or discarded. The off-gases from the horizontal separator are further processed in a scrubber to provide environmental compatibility discharge thereof or for use with combustible elements as fuel. A vacuum pump or system is coupled to the horizontal separator which pulls a vacuum thereon, and likewise, throughout the vapor recovery system to provide a slight vacuum in the pyrolysis chamber which withdraws the off-gases and vapors from the pyrolysis chamber for recovery of liquids and gases which are processed for safe environmental disposal or recovery and reuse.

It is an object of the invention to provide an economical, continuous pyrolysis system for reclamation and environmentally safe disposal of used batteries, such as, nickel cadmium, lithium, carbon-zinc, mercury, alkaline, metal hydride, etc. whereby, the metallic components are reclaimed as solids. The liquids and off-gases are further processed to separate liquids and off-gases in an environmentally safe process for recovery and reuse or disposal.

BRIEF DESCRIPTION OF THE DRAWINGS

In the drawings,

FIG. 2 is a schematical representation of a two screen collector for separating various solids recovered; and FIG. 3 is a schematical representation of the vapor recovery system for the pyrolysis chamber which provides a slight vacuum in the pyrolysis chamber.

DESCRIPTION OF PREFERRED EMBODIMENT

Figure 1:
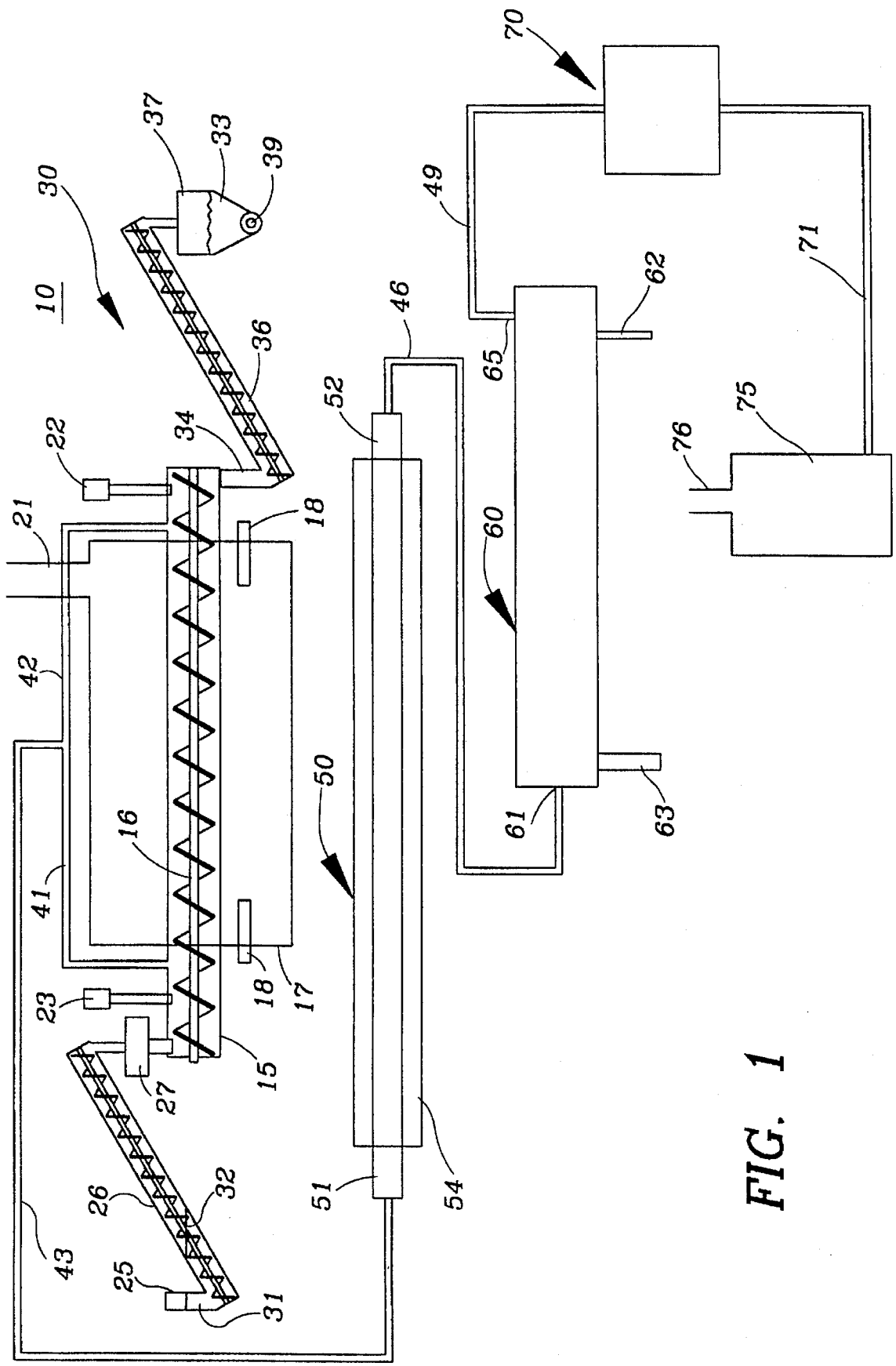
FIG. 1 is a schematical view illustrating the battery pyrolysis process and apparatus.

Referring now particularly to FIGS. 1–3, there is illustrated apparatus suitable for performing the process generally referred to as 10. The apparatus for performing the process includes a tubular pyrolysis chamber 15 which has a screw conveyor 16 for transferring batteries through the heated zone for pyrolysis. A furnace 17 surrounds and extends along the pyrolysis chamber 15. Furnace 17 has a pair of burners 18 and 19 which may be fired by gas or other fuel. The off-gas from furnace 17 exits through flue 21. Pyrolysis chamber 15 is provided with a pair of pop off valves 22 and 23 for safety reasons. Used batteries of various sizes are continuously placed in hopper 25 which is filled with liquid. Attached in sealing arrangement with the hopper 25 is screw conveyor 26 which carries the batteries fed into hopper 25 to crusher 27 wherein the batteries are sufficiently crushed to ensure that whole batteries are not admitted to pyrolysis chamber 15 and hence pose an explosion hazard. It will be understood that the batteries could be crushed before being placed in hopper 25 and crusher 27 would not be required. A liquid 31, such as, water is maintained at a level 32 in the hopper 25 and screw conveyor 26 to exclude oxygen or air entering into the crusher 27 and thence, into the pyrolysis chamber 15.

The solid material 33 remaining after pyrolysis is discharged from pyrolysis chamber 15 through housing 34 onto a screw conveyor 36 which transfers the solid material 33 into a closed bin 37. Closed bin 37 is designed with pressure sensitive switches to discharge a portion of solid material 33 onto a screw conveyor 39 for transporting to the screening collector 80 (see FIG. 2) for separation of the solid battery components. This arrangement effects a seal of closed bin 37 which excludes air or oxygen entering pyrolysis chamber 15 from closed bin 37.

Referring to FIG. 2, screen collector 80 has a coarse screen 81 and a fine screen 82 which are vibrated to separate the various size solid battery components, and discharge them through chutes 83, 84 and 85.

Referring now to FIG. 3, in addition to FIG. 1, flow lines 41 and 42 connect opposite ends of pyrolysis chamber 15 and join flow line 43 which leads to heat exchanger 50. Flow line 46 connects heat exchanger 50 to liquid/gas separator 60. Flow line 49 leads to a vacuum pump 70. Vacuum pump 70 is connected to scrubber 75 by flow line 71 which has an outlet 76. Heat exchanger 50 has an inlet 51 and an outlet 52. Cooling jacket 54 (schematically depicted) surrounds heat exchanger 50 for condensing liquids from the vapor stream. Heat exchanger 50 is elevated at inlet 51 to ensure that all of the liquid condensed in heat exchanger 50 is transferred through line 46 to separator 60 via inlet 61. Separator 60 includes a float valve (not shown) which controls the discharge liquid through line 62. Separator 60 also includes a drain 63. The gaseous components of the off-gas exit the separator 60 at gas outlet 65 through line 49 through vacuum pump 70, discharge line 71 and through scrubber 75. Vacuum pump 70 maintains a slight vacuum in pyrolysis chamber 15.

In a typical operation for recovery and reclamation of various batteries, other than lead acid, as illustrated in FIG. 1, the various size batteries would be continuously fed into hopper 25 and transferred through the liquid 31 by auger 26 into crusher 27. The crusher 27 would provide sufficient crushing and grinding of the batteries to avoid any potential explosive hazard and enhance the pyrolysis operation. Typically, the batteries would be crushed and ground to approximately half inch mesh. The batteries from crusher 27 are deposited on screw conveyor 16 in pyrolysis chamber 15 which transfers the batteries through furnace 17 surrounding the pyrolysis chamber 15. The solid materials remaining after pyrolysis step are transferred through housing 34 onto screw conveyor 36 and into closed bin 37. Closed bin 37 has a pressure sensitive release for maintaining a minimum level of solid material 33 in closed bin 37, thereby to exclude air or oxygen flowing from the collector system 30 into the pyrolysis chamber 15.

The off-gases from the pyrolysis chamber 15 are passed through vacuum lines, through heat exchanger 50 and liquid/gas separator 60 through the vacuum pump 70 and are treated in scrubber 75 depending on the type of gases involved. The liquids separated in the liquid/gas separator 60 are discharged through a float controlled valve (not shown) into line 62 for storage or further use or disposal.

The solid material 33 is transferred to screening collector 80 by screw conveyor 39. Screening collector 80 includes an upper screen 81 and a lower screen 82. Typically the upper screen 81 would have a 0.078 to 0.094 of an inch mesh and lower screen 82 would have 0.036 to 0.063 of an inch mesh which effectively separates the carbon residue and plastic remaining on screen 81 and discharged through chute 83 for disposal or other processing. Ferrous and non-ferrous metals, such as, iron, copper, and solder would be retained on lower screen 82 and removed through chute 84. The zinc magnesium dioxide, nickel cadmium that pass through lower screen 82 would be collected through chute 85 for further processing and use.

The pyrolysis chamber 15 would typically be operated in a temperature range between 350° to 650° F.

The vacuum pump 70 maintains a vacuum on pyrolysis chamber 15 of approximately one-half inch of mercury (five inches of water).

The pressure sensitive switch to operate a discharge valve (not shown) may be obtained from any material sales store, under U.S. Registered Trademark BIN-DICATOR, as utilized in collection system 30 of FIG. 1, to maintain the desired level of solid material 33 collected in closed bin 37 to ensure the system is sealed from air and oxygen entering the pyrolysis chamber.

It will be understood that the preferred embodiment of the invention has been disclosed and that other changes and modifications would be suggested which are within the scope of this invention.

What is claimed is:

1. A process for reclamation and recovery of battery components from used non-lead acid batteries for reuse or environmentally safe disposal comprising:

transferring non-lead acid batteries from a hopper by a feed screw conveyor into a crusher wherein the batteries are crushed and delivered into a pyrolysis chamber;

maintaining a liquid in the hopper and screw conveyor to exclude the atmosphere from passing through the feed screw conveyor, the crusher and into the pyrolysis chamber;

transferring said crushed batteries with an auger through said pyrolysis chamber;

heating the crushed batteries to a temperature sufficient to decompose the crushed batteries in the pyrolysis chamber;

discharging the resulting solid materials from the pyrolysis chamber through a recovery screw conveyor system into a recovery bin;

excluding the atmosphere from passing through the recovery bin, the recovery screen conveyor and into the pyrolysis chamber;

maintaining a vacuum in said pyrolysis chamber sufficient to remove vapors during said decomposition;

condensing said vapors in a heat exchanger to obtain liquid and gaseous material;

separating said liquid from said gaseous material in a liquid/gas separator;

withdrawing said liquids from said liquid/gas separator;

removing said vapors from said liquid/gas separator through a vacuum system and treating said gaseous vapors for recovery;

transferring said solid material from said bin to a screen separator; and separating said solid material into the various battery components.

2. The process of claim 1 wherein the crushed batteries are heated to a temperature between 350° to 650° F. in the pyrolysis chamber.

3. The process of claim 1 wherein the vacuum maintained in the pyrolysis chamber is about one-half to one inch of mercury.

4. The process of claim 1 wherein the crushed batteries are heated in the pyrolysis chamber to a temperature between 350° to 650° F. and the vacuum is about one-half to one inch of mercury.

5. The process of claim 1 wherein only nickel cadmium batteries are processed.

* * * * *